United States Patent [19]

Lönne et al.

[11] Patent Number: 4,762,330
[45] Date of Patent: Aug. 9, 1988

[54] SEALING RING

[75] Inventors: Klaus Lönne; Klaus-Peter Majewski, both of Burscheid; Franz-Josef Giesen, Odenthal; Rüdiger Voigt, Burscheid, all of Fed. Rep. of Germany

[73] Assignee: Goetze AG, Burscheid, Fed. Rep. of Germany

[21] Appl. No.: 850,031

[22] Filed: Apr. 10, 1986

[30] Foreign Application Priority Data

Apr. 10, 1985 [DE] Fed. Rep. of Germany ....... 3512751

[51] Int. Cl.$^4$ .............................................. F16J 15/12
[52] U.S. Cl. .................................... 277/230; 277/101;
    277/106; 277/235 R; 277/235 A; 277/DIG. 6;
    285/332.1; 285/368; 285/412; 285/910;
    285/917; 384/297; 384/300; 384/907; 384/908;
    428/141; 428/256; 428/422; 428/698
[58] Field of Search .......... 277/230, 223, 224, 235 R,
    277/235 A, 1, DIG. 6, 96.2, 96.1, 227, 101, 105,
    106; 384/300, 297, 907, 908; 285/332.1, 910,
    412, 368, 917; 428/698, 422, 256, 255, 141

[56] References Cited

U.S. PATENT DOCUMENTS

| 3,013,444 | 12/1961 | Burkhard et al. | 384/300 X |
| 3,024,047 | 3/1962 | Schmohl | 277/235 A X |
| 3,108,018 | 10/1963 | Lewis | 277/DIG. 6 |
| 3,616,188 | 10/1971 | Mancel | 384/300 X |
| 3,903,959 | 9/1975 | Fushimi et al. | 277/96.2 X |
| 3,985,513 | 10/1976 | Silaev et al. | 75/235 |
| 4,099,729 | 7/1978 | Nylykke | 277/96.1 |
| 4,140,448 | 2/1979 | Brinkeborn et al. | 425/77 |
| 4,309,474 | 1/1982 | Hodes et al. | 384/907 X |
| 4,416,458 | 11/1983 | Takenaka et al. | 277/1 X |
| 4,601,476 | 7/1986 | Usher et al. | 277/230 |
| 4,607,851 | 8/1986 | Usher | 277/230 X |

FOREIGN PATENT DOCUMENTS 173662 10/1982 Japan ................................. 277/230

Primary Examiner—Allan N. Shoap
Attorney, Agent, or Firm—Spencer & Frank

[57] ABSTRACT

A sealing ring, having a ring body made, for example, of high-temperature resistant compressed metal fibers includes a roughened surface adapted to be pressed against and displaced by sliding relative to a counterface.

4 Claims, 1 Drawing Sheet

SEALING RING

BACKGROUND OF THE INVENTION

This invention relates to a sealing ring having at least one surface serving as a sliding face being in a face-to-face sliding engagement with a counter-face. Such a sealing ring comprises a low-friction material and is preferably a compressed, metal fiber body of superior high temperature-resistant properties. The sealing ring may find advantageous use, for example, in articulated exhaust pipes for internal combustion engines. The sliding faces of the sealing ring may be coated with a low-friction material.

To neutralize vibrations caused by an internal combustion engine it is known to make the ends of the exhaust pipe and the exhaust manifold generally as ball joint elements having a spherical half and a complemental, dished half and to urge these components axially together by a resilient clamping arrangement. Such a connection permits a certain relative angular displacement of the interconnected tubular parts. The required sealing ring interposed between the ball and the socket of the ball joint is adapted to the contour thereof and thus has a sliding face shaped as a spherical segment. In such a construction the sealing ring also serves as a slide bearing for the interconnected pipe ends.

As noted earlier, such sealing rings are made of low-friction materials. Preferably sealing rings of compressed metal fibers and low friction substances are used. For example, according to German Offenlegungsschrift (Non-examined Published Patent Application) No. 2,829,333, a steel mesh which is coated with a low-friction material such as graphite or mica scales or flakes, is spirally wound to form a ring blank which is subsequently pressed to the desired shape. According to German Pat. No. 2,845,949 a ring skeleton made of long steel fibers is pre-pressed, the obtained body is penetrated and coated with a low-friction material such as graphite powders or mica powders and thereafter the body is pressed to the desired final shape. In such rings the long fibers, however, can pierce the outer, low-friction layers and thus the latter may break off or peel off, whereupon the exposed fibers directly contact the pipe end and cause noise, worn traces with subsequent corrosion phenomena.

To avoid the above-outlined occurrences and to thus minimize wear phenomena, German Pat. No. 3,107,920 discloses the use of a metal fiber wool with a random alignment of the metal fibers for making the ring skeleton. The metal fibers have short lengths which, apart from their simpler manufacture, reduce wear and corrosion phenomena.

While in practice, such rings avoid the wear and corrosion phenomena to a great extent, nevertheless, during engine operation, between the joined exhaust pipes relative motions occur which, despite the high proportion of friction reducing material and occasionally graphite layers, disadvantageously result in noise emission, particularly in the generation of squeaking noises.

To avoid such occurrences, according to German Pat. No. 3,234,376, to the short-fiber low-friction mixtures inorganic or organic substances are mixed which, at elevated temperatures, react with the metal fibers heated by friction and smoothen the sliding faces of the rings. While in this manner noise generation is reduced during normal operation, such noises could not be entirely eliminated, particularly in the break-in phase of the rings because of the only slowly developing polish.

It is further known to provide the sliding faces of the rings with thin coatings, particularly of polytetrafluoroethylene, to eliminate noise generation. Such coatings, however, begin to flow plastically on the sliding face in response to pressure, temperature and friction stresses and are relatively rapidly destroyed during the break-in period of the engine. A permanent elimination of noise generation at the seal is therefore not feasible with such measures.

SUMMARY OF THE INVENTION

It is an object of the invention to provide an improved sealing ring of the above-outlined type which effectively eliminates noise generation for a long service period at the seal during engine operation.

This object and others to become apparent as the specification progresses, are accomplished by the invention, according to which, briefly stated, the external sliding face of the sealing ring is roughened by a mechanical process such as embossing or by a chemical process, such as etching.

During engine tests involving the roughened sealing rings according to the invention, it has been unexpectedly found that the rings, contrary to rings pressed from graphite, or mica and metal fibers and occasionally coated with graphite or mica, do not cause noise generation, particularly in the break-in phase of the sealing ring. The graphite or mica powder necessary for an optimal pressing of the metal fibers which, by themselves, have good sliding properties and are expected to reduce noise generation, appear to be in practice directly responsible for the noise generation. By means of the roughening of the sliding faces according to the invention, the softer graphite and mica powder is removed from the surface zones and the undesired noise generation has been unexpectedly suppressed.

A further ameliorated behavior of the sealing rings according to the invention is achieved by additionally providing a layer of hexagonal boron nitride powder on the roughened sliding face of the sealing ring. The hexagonal boron nitride powder may be rubbed or pressed into the roughened sliding surface such that approximately 0.03 gram boron nitride per $cm^2$ is obtained. The boron nitride settles preponderantly in depressions of the roughened surfaces and is, during sliding stresses, further rubbed into the recesses. Upon wear of the sliding face the applied boron nitride results in an ameliorated sliding property. If the surfaces are only roughened, then after an extended service the graphite and mica particles in the outer surface could again cause noise generation. By virtue of the boron nitride treatment, even after an extended service, noise generation and wear phenomena caused by the freely exposed metal fibers are effectively suppressed.

According to a further feature of the invention, the boron nitride may be applied, for the purpose of improved adhesion, as dispersions in organic or inorganic binders, such as synthetic resins based on coumarone resins, silicone resins, epoxy resins or phenol resins or in dissolved alkali silicates. Even in case of pyrolysis of the synthetic resins during engine operation, the boron nitride remains securely immobilized in the depressions of the roughened surface.

According to a further feature of the invention polytetrafluoroethylene powder may be mixed to the boron nitride. Good results have been achieved with mixtures formed of one part by weight of boron nitride with up to two parts by weight of polytetrafluoroethylene powder.

The invention thus provides a sealing ring for articulated joints between exhaust pipe portions which are associated with internal combustion engines, which are exposed to high temperatures and in which the disadvantageous noise generation on the sliding faces is efficiently suppressed during engine operation. Particularly by virtue of the firm binding of the boron nitride on the roughened sliding face, the sealing ring operates in a noise-free manner for a long period even after the destruction of the binder material due to temperature-caused stresses. The coating of the sealing ring sliding faces with boron nitride according to the invention thus prevents efficiently undesired squeaking sounds during the entire service life of the seal during engine operation.

DESCRIPTION OF THE PREFERRED EMBODIMENTS

Figure 1:
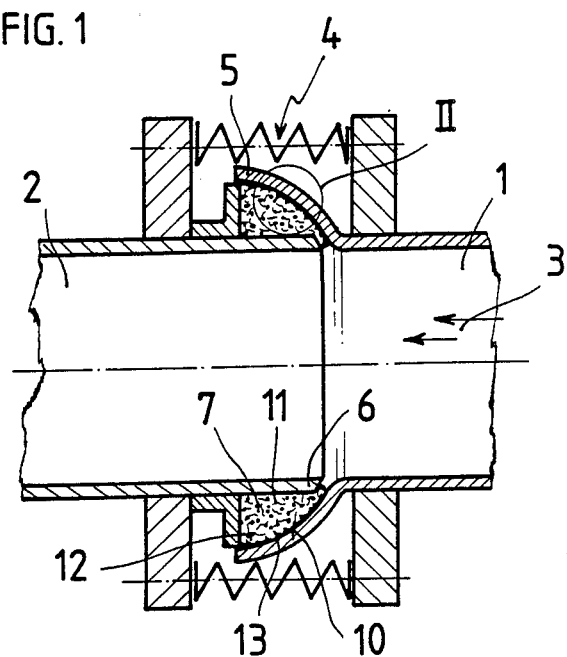
FIG. 1 is an axial sectional view of a preferred embodiment of the invention.

Turning to FIG. 1, there is shown an exhaust manifold 1 and an exhaust pipe 2 through which the exhaust gases flow in the direction of the arrows 3. The exhaust manifold 1 and the exhaust pipe 2 are connected to one another by means of a joint generally designated at 4. The joint 4 comprises a spherical socket 5 which is formed as an enlargement of the terminus of the exhaust manifold 1. The terminal portion of the exhaust pipe 2 projecting into the zone of the socket 5 is cylindrical. A sealing ring 7 is installed between the two pipes 1 and 2.

The body of the sealing ring 7 is formed of a firm mass of high grade steel fibers 11 and graphite particles 12 mixed together. The sealing ring 7 has an outer surface 10 which has the shape of a spherical segment and serves as a sliding face, cooperating with the inner face of the socket 5 of the exhaust manifold 1.

Figure 2:
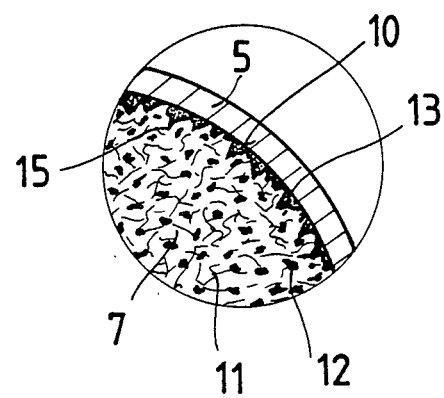
FIG. 2 is a detail of the inset II of FIG. 1, shown in a significantly enlarged scale.

Turning now to FIG. 2, the sliding face 10 of the sealing ring 7 is roughened by a known process whereby depressions 15 are obtained in which a mixture of boron nitride and a binder are deposited. This substance also forms a coating 13 on the sliding face 10 of the sealing ring 7.

It will be understood that the above description of the present invention is susceptible to various modifications, changes and adaptations, and the same are intended to be comprehended within the meaning and range of equivalents of the appended claims.

What is claimed is:

1. A sealing ring comprising a ring material formed of a compressed mixture of a high-temperature resistant metal fiber and a low-friction material; said sealing ring having a surface adapted to be pressed against and displaced by sliding relative to a counter-face; said surface being free from said low-friction material and being roughened.

2. A sealing ring as defined in claim 1, further comprising a coating of hexagonal boron nitride carried on said roughened surface, said coating being chemically distinct from said low-friction material.

3. A sealing ring as defined in claim 2, wherein said hexagonal boron nitride is present in a quantity of up to 0.03 g/cm$^2$.

4. A sealing ring as defined in claim 2, wherein said hexagonal boron nitride is present in a mixture with polytetrafluoroethylene powder of up to twice the quantity by weight of the hexagonal boron nitride.

* * * * *